No. 713,635. Patented Nov. 18, 1902.
A. E. HARRIS.
COOKING APPARATUS.
(Application filed Apr. 28, 1902.)

(No Model.) 3 Sheets—Sheet 1.

Witnesses Inventor

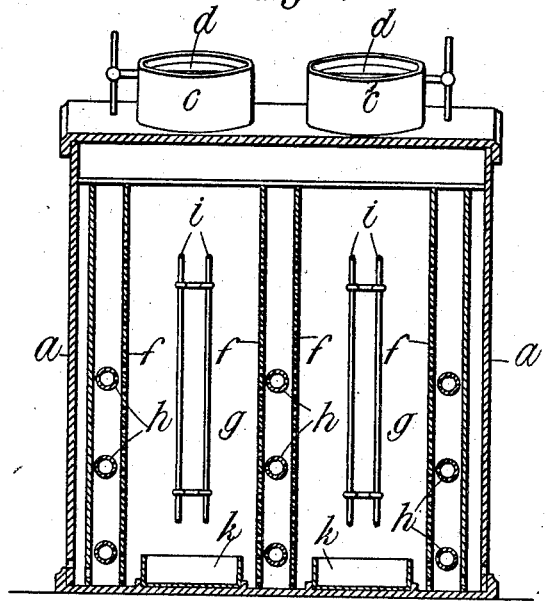
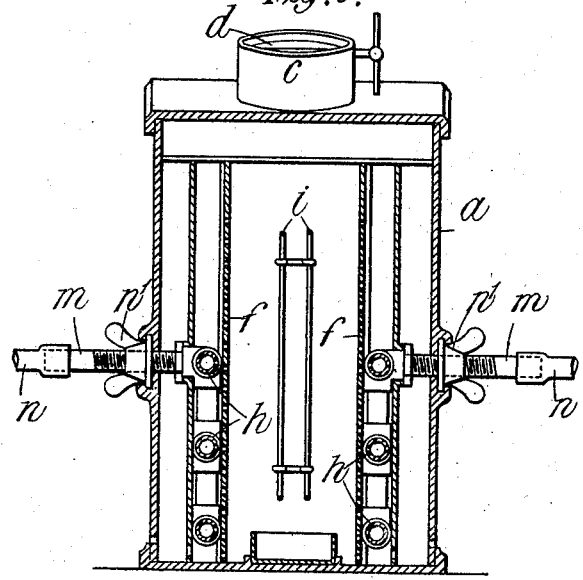

No. 713,635. Patented Nov. 18, 1902.
A. E. HARRIS.
COOKING APPARATUS.
(Application filed Apr. 28, 1902.)
(No Model.) 3 Sheets—Sheet 3.
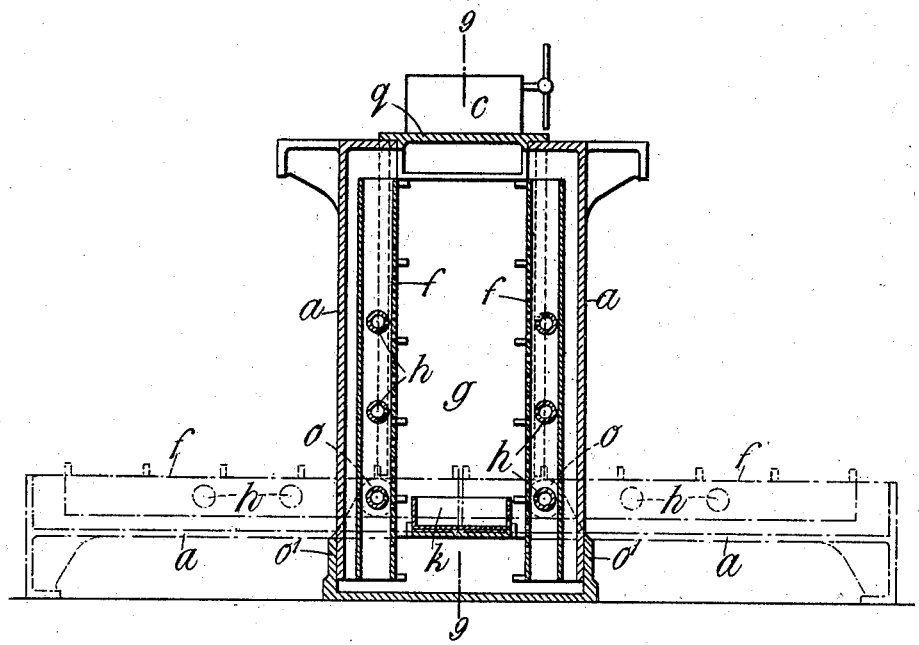
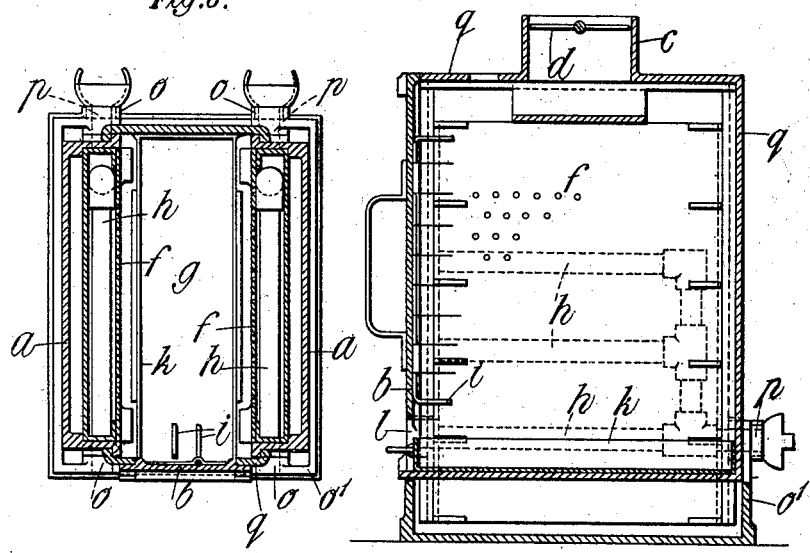

UNITED STATES PATENT OFFICE.

ALFRED ELLIS HARRIS, OF LONDON, ENGLAND.

COOKING APPARATUS.

SPECIFICATION forming part of Letters Patent No. 713,635, dated November 18, 1902.

Application filed April 28, 1902. Serial No. 104,995. (No model.)

*To all whom it may concern:*

Be it known that I, ALFRED ELLIS HARRIS, a subject of the King of Great Britain, residing at 64 Finsbury Pavement, London, England, have invented new and useful Improvements in Cooking Apparatus, of which the following is a specification.

My invention has for its object to provide means whereby meat or other food can be grilled or cooked more quickly than with fireplaces or stoves of ordinary construction.

According to my invention I provide an apparatus wherein a pair or series of pairs of surfaces designed to be heated to incandescence, and hereinafter referred to as "radiating-plates," is or are arranged with a space or spaces between them, into which the meat to be grilled or cooked can be introduced and supported in any desirable manner.

In practice I advantageously make use of gas as the heating medium.

To enable my invention to be fully understood, I will describe the same by reference to the accompanying drawings, in which—

Figure 1:
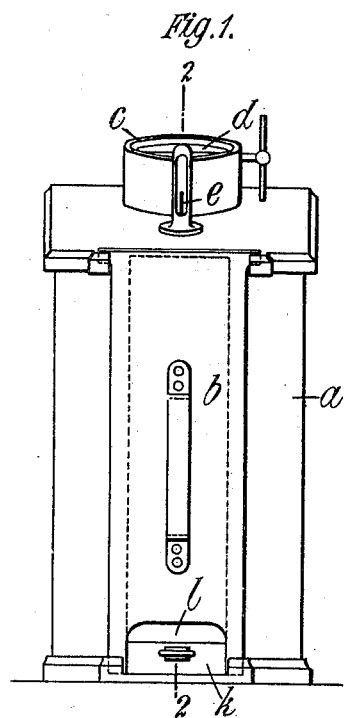
Figure 2:
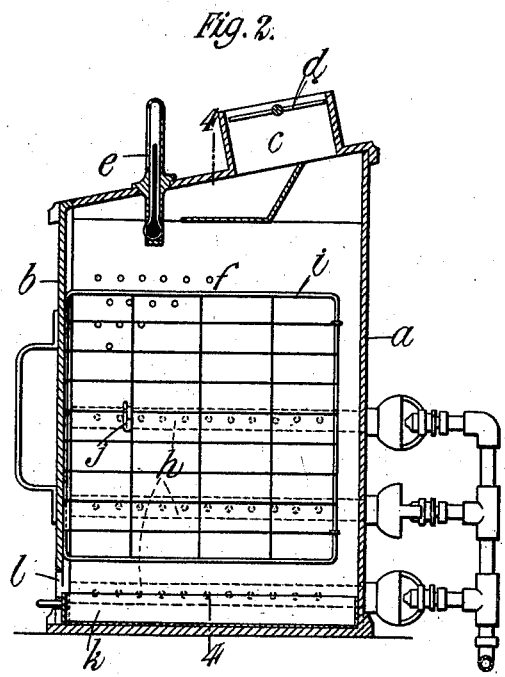
Figure 3:
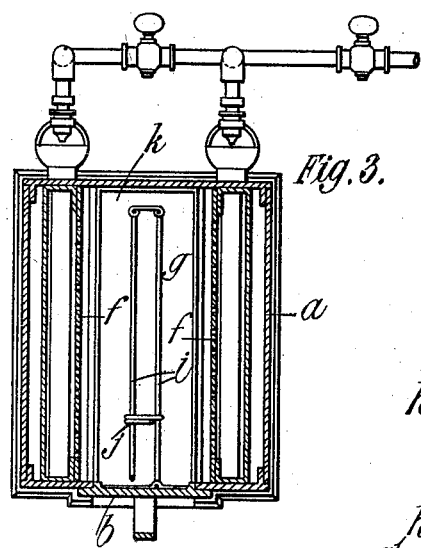
Figure 4:
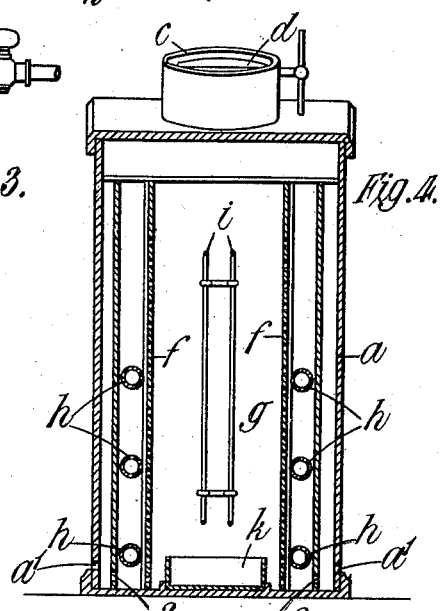

Figure 1 is a front elevation of a cooking apparatus constructed according to my invention and having a single cooking-space. Fig. 2 is a vertical section of the same on the line 2 2, Fig. 1. Fig. 3 is a horizontal section, and Fig. 4 is a section on the line 4 4, Fig. 2. Fig. 5 is a view similar to Fig. 4, but illustrating the arrangement wherein two or more cooking-spaces are arranged side by side. Fig. 6 is a view similar to Fig. 4, but illustrating a modification of my invention; and Fig. 7 is a view illustrating another modification. Fig. 8 is a horizontal section of the arrangement shown in Fig. 7; and Fig. 9 is a vertical section on the line 9 9, Fig. 7.

$a$ is the casing of the apparatus, which may be of cast or sheet metal, the said casing being provided with a removable front portion $b$ and having in the top a pipe $c$ for the escape of the products of combustion, steam, or the like and provided with a damper $d$. Another aperture is also provided, into which a thermometer $e$ can be inserted. Inside the casing are the radiating-plates $f\,f$ of the cooking-space $g$. As shown, these radiating-plates $f\,f$ are perforated and adapted to be heated by means of gas supplied through Bunsen burners $h\,h$, arranged behind the said plates.

The removable front $b$, as shown, has attached to it two wirework plates $i\,i$, hereinafter referred to as the "grill," one of which plates is pivoted relatively with the other to allow of inserting the food to be cooked between them, a clip $j$ being provided for holding them in their closed position.

$k$ is a tray placed at the bottom of the space $g$ and serving to catch the melted fat. This tray, as shown, is made separate from the removable front $b$, but it may, if desired, be attached to it, so as to move with it and the grill $i\,i$.

At the lower part of the removable front plate $b$ is an aperture $l$ for allowing the flow of air through the heating-space $g$ if the damper $d$ is opened.

$a'\,a^2$ are holes in the casing $a$ and radiating-plates $f\,f$ for supplying the burners $h\,h$ with air.

With the arrangement hereinbefore described it will be understood that the meat or the like carried in the grill $i\,i$ and inserted into the space $g$ between the radiating-plates $f\,f$ will be cooked on both sides simultaneously, and consequently much more rapidly than is the case with food cooked on an ordinary grill, where the heat is only applied to one side at a time.

The arrangement shown in Fig. 5 only differs from that shown in Fig. 4 in that two heating-spaces $g\,g$ are arranged side by side. In this arrangement it will be obvious that the central set of burners $h\,h$ will serve for heating the inner radiating-plates of both heating-spaces. It will also be understood that three or more chambers can be similarly arranged side by side.

In the modification of my invention shown in Fig. 6 the radiating-plates $f\,f$, together with the burners $h\,h$, are adapted to be moved toward and away from each other, so as to permit of adjusting the distance of the said radiating-plates from the food to be cooked. As shown, I provide for this adjustment of the radiating-plates by screw-threading the tubes $m\,m$ through which gas is supplied to the burners $h\,h$ by means of flexible pipes $n\,n$ and arranging on the screw-threads nuts $n' n'$, which are held against longitudinal movement—for instance, as shown in the drawings—in such a manner that the rotation of the said nuts causes the longitudinal movement of the tubes, and consequently also of the radiating-plates.

I sometimes provide that when my apparatus is not required for grilling and like purposes it may be used for boiling purposes. To allow of this, the sides of the casing of the apparatus, together with the radiating-plates $f f$, are made separate from one another, as clearly shown in Fig. 7, the said radiating-plates being pivoted in bearings $o\ o$ in a base $o'$ by means of the tubes $p\ p$ through which the gas is delivered to the burners and by one end of the lowest burner-tubes, whereby when the said two parts are turned down—for instance, from the position shown in full lines in Fig. 7 to that indicated by the dotted lines—a hot plate will be formed. It will be understood that the portion $q$ of the casing which closes the grilling-space at the top, back, and front is made separate from the sides and is removed when the apparatus is arranged for boiling purposes. The front $b$ of the apparatus is made removable, as hereinbefore described. This latter arrangement is very advantageously used in connection with gas cooking-stoves.

In some cases where large quantities of food have to be dealt with I elongate the cooking-chamber to such an extent and arrange for traversing the food to be cooked through it at such a speed that by the time the food has passed through the whole length of the said chamber it will have been cooked. A suitable arrangement for this purpose consists in forming two concentric radiating-plates, forming a circular cooking-space between them, a door being provided through which the attendant can remove one portion of food which has been cooked and introduce another portion to be cooked.

I do not limit myself to the exact details of construction, as they may be varied in many particulars without departing from the principle of my invention. For instance, other heating devices may be employed in the place of those here shown.

Having now particularly described and ascertained the nature of my said invention and in what manner the same is to be performed, I declare that what I claim is—

1. In a cooking apparatus, the combination with heat-radiating plates forming the side walls of a cooking-chamber, of means of adjusting said plates to different distances from each other, substantially as described.

2. In a cooking apparatus, the combination with the heat-radiating plates forming the side walls of a cooking-chamber, of the adjusting-screws and nuts for adjusting the said plates to different positions in respect to each other, substantially as described.

3. In a cooking apparatus, the combination with the vertical adjusting-plates, of a support for said plates, said plates being pivoted to said support to permit said plates to be turned to a horizontal position, substantially as described.

4. In a cooking apparatus, the combination with the casing forming a cooking-chamber, said chamber having heat-radiating plates at each side of the same, of a removable front for closing said chamber, said removable front being provided with wirework plates for holding the food to be cooked between said plates, substantially as described.

ALFRED ELLIS HARRIS.

Witnesses:
JOHN E. BOUSFIELD,
C. G. REDFERN.